(12) United States Patent
Watarai

(10) Patent No.: US 7,490,700 B2
(45) Date of Patent: *Feb. 17, 2009

(54) BICYCLE MOTION SENSING ARRANGEMENT

(75) Inventor: Etsuyoshi Watarai, Izumi (JP)

(73) Assignee: Shimano Inc., Osaka (JP)

( * ) Notice: Subject to any disclaimer, the term of this patent is extended or adjusted under 35 U.S.C. 154(b) by 255 days.

This patent is subject to a terminal disclaimer.

(21) Appl. No.: 11/142,341

(22) Filed: Jun. 2, 2005

(65) Prior Publication Data

US 2006/0272903 A1 Dec. 7, 2006

(51) Int. Cl.
*B62L 1/00* (2006.01)

(52) U.S. Cl. .................. 188/24.11; 188/24.22; 324/174

(58) Field of Classification Search ............. 188/24.11, 188/24.12, 24.21, 24.22; 324/160, 166, 173, 324/174, 207.21, 207.22, 207.25, 226, 262; 280/281.1, 288.4
See application file for complete search history.

(56) References Cited

U.S. PATENT DOCUMENTS

| | | | | |
|---|---|---|---|---|
| 4,156,190 A | | 5/1979 | Chittenden et al. | |
| 5,089,775 A | * | 2/1992 | Takeda | 324/174 |
| 5,545,982 A | | 8/1996 | Vlakancic | |
| 5,963,128 A | * | 10/1999 | McClelland | 340/447 |
| 6,293,140 B1 | | 9/2001 | Lohberg | |
| 6,448,763 B1 | * | 9/2002 | Spellman | 324/207.21 |
| 7,032,443 B2 | * | 4/2006 | Moser | 73/146.5 |
| 2004/0239492 A1 | * | 12/2004 | Katou | 340/445 |

FOREIGN PATENT DOCUMENTS

| | | |
|---|---|---|
| DE | 9202393 | 5/1992 |
| EP | 0432475 | 6/1991 |
| JP | 07280821 | 10/1995 |
| JP | 2001-504575 A | 4/2001 |

* cited by examiner

*Primary Examiner*—Pam Rodriguez
(74) *Attorney, Agent, or Firm*—Global IP Counselors, LLP

(57) ABSTRACT

A bicycle motion sensing arrangement is provided has a bicycle wheel, a bicycle brake and a sensor. The bicycle wheel includes an air valve stem and a magnet mounted to the air valve stem. The bicycle brake is configured to be mounted to a bicycle frame. The sensor is fixedly attached to the bicycle brake at a location to detect rotational behavior of a bicycle wheel by sensing the magnet mounted to the air valve stem.

10 Claims, 10 Drawing Sheets

BICYCLE MOTION SENSING ARRANGEMENT

BACKGROUND OF THE INVENTION

1. Field of the Invention

This invention generally relates to a bicycle sensor unit. More specifically, the present invention relates to a bicycle sensor unit, which is integrated with a bicycle brake device.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. Recently, the bicycle industry has added various electronic components to the bicycle. These electronic components are often controlled by a cycle computer, which controls the components based on information such as speed, cadence, rider inputs, etc. Cycle computers can also be used simply to make bicycle riding more enjoyable (e.g. by displaying various information to the rider such as time, elapsed time, speed, distance, average speed, etc.).

In any case, the cycle computer is typically mounted on the bicycle handlebar and is electrically coupled to various components and/or sensors in order to control components and/or display various information to the rider. Usually, at least one sensor is coupled to the front fork in order to sense the rotational behavior of a magnet that is coupled to the front wheel. The front fork is non-movably coupled to the handlebar and pivotally coupled to the frame so that the rider can steer the bicycle. The magnet is typically coupled to the spokes of the front wheel.

While these typical cycle computers and electrical components work well, there are some drawbacks. In particular, the sensor coupled to the front fork often has a wire that needs to be routed up the fork, past the front brake device and along the frame to the cycle computer mounted on the handlebar. If the wire is too long, which is usually the case, the wire needs to be wound around various parts of the bicycle (e.g. the front fork, the front braking device and the frame) until the wire is the appropriate length. If the wire is wound too much, the wire can bind when the fork is turned. If the wire is not wound enough, the wire can be more easily caught on obstructions. Thus, it is difficult and/or inconvenient to optimally install these prior sensors. This problem is exaggerated when the sensor is coupled to a suspension fork. Also, it can relatively difficult and/or inconvenient to properly install the prior magnets on the spokes of the wheel. Finally, even if these prior devices are installed properly, the wire, sensor and/or magnet can be contacted relatively easily by obstructions or debris. This contact can cause damage or move parts out of proper alignment.

In view of the above, it will be apparent to those skilled in the art from this disclosure that there exists a need for an improved bicycle sensor unit, which can be integrated with a bicycle brake device. This invention addresses this need in the art as well as other needs, which will become apparent to those skilled in the art from this disclosure.

SUMMARY OF THE INVENTION

One object of the present invention is to provide a bicycle sensor unit, which can be integrated with a bicycle brake device in simple, unobtrusive manner.

Another object of the present invention is to provide a bicycle sensor unit, which can be retrofitted with an existing bicycle brake device.

Yet another object of the present invention is to provide a bicycle sensor unit for a bicycle brake device, which is relatively simple and inexpensive to manufacture, assemble and/or retrofit to existing bicycles.

The foregoing objects can basically be attained by providing a bicycle motion sensing arrangement that comprises a bicycle wheel, a bicycle brake and a sensor. The bicycle wheel includes an air valve stem and a magnet mounted to the air valve stem. The bicycle brake is configured to be mounted to a bicycle frame. The sensor is fixedly attached to the bicycle brake at a location to detect rotational behavior of a bicycle wheel by sensing the magnet mounted to the air valve stem.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
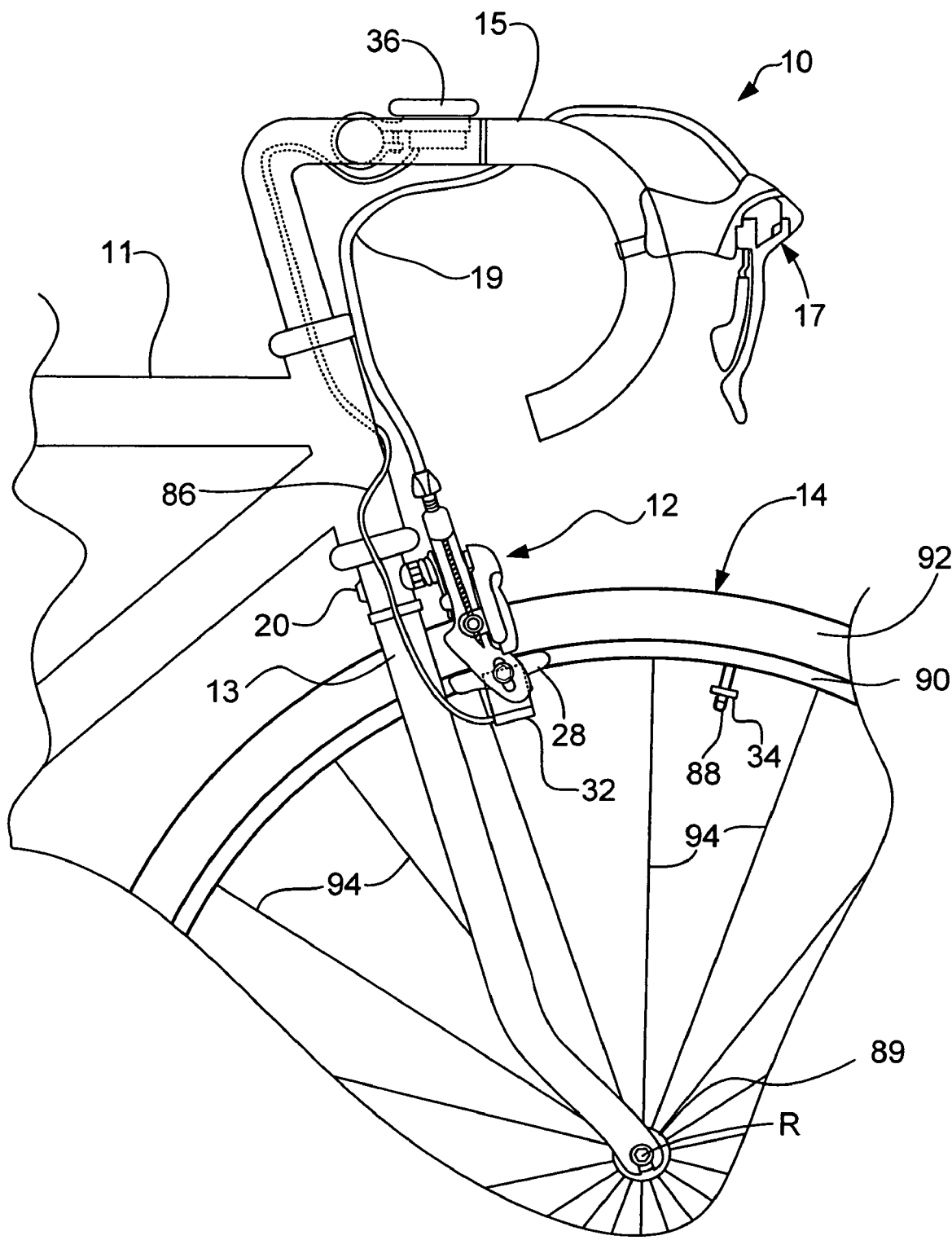
FIG. 1 is a side elevational view of a portion of a bicycle equipped with a bicycle brake device in accordance with a first embodiment of the present invention.

Referring initially to FIG. 1, a front portion of a bicycle 10 with a bicycle brake device 12 and a front wheel 14 coupled thereto is illustrated in accordance with a first embodiment of the present invention. The bicycle 10 is conventional, except for the brake device 12 and the front wheel 14. Thus, the bicycle 10 includes a frame 11 with a front fork 13 pivotally coupled thereto. The front wheel 14 is rotationally coupled to the front fork 13 in a conventional manner to rotate about a rotation axis R. A handlebar 15 is fixedly coupled to the front fork 13 to steer the bicycle 10 by turning the front wheel 14 in a conventional manner. At least one conventional bicycle brake/shift control device 17 is mounted on the handlebar 15 to operate the brake device 12 via a brake control cable 19 in a conventional manner. The brake control cable 19 basically includes an inner wire 19a and an outer sheath 19b in a conventional manner. Because the bicycle 10 is conventional, except for the brake device 12 and the front wheel 14, the bicycle 10 will not be discussed and/or illustrated in detail herein, except as needed to make and use the present invention.

Referring now to FIGS. 1-6, the bicycle brake device 12 of the present invention will now be explained in more detail. Preferably, the bicycle brake device 12 basically includes a bicycle brake attachment member 20, a first brake arm 22, a second brake arm 24, a link member 26, a pair of brake shoes 28, a biasing member 30, a sensor 32, a wheel magnet 34 and a cycle computer 36. The brake attachment member 20, the first brake arm 22, the second brake arm 24, the link member 26, the brake shoes 28 and the biasing member 30 generally constitute a primary braking structure, while the remaining parts of the bicycle brake device 12 are add-on or auxiliary parts of the bicycle braking device 12. However, it will be apparent to those skilled in the bicycle art from this disclosure that at least the sensor 32 can be integrated with the primary braking structure as needed and/or desired.

The brake attachment member 20 is fixedly, non-movably attached to the front fork 13 of the bicycle 10 in a conventional manner. The brake shoes 28 are preferably fixedly attached to the brake arms 22 and 24 in a conventional manner. The mounting member 20, the first brake arm 22, the second brake arm 24, the link member 26 and the biasing member 30 are preferably coupled together in a conventional manner to normally bias the brake shoes 28 out of engagement (i.e. away from) the front wheel 14 in a conventional manner. Thus, when the rider actuates the brake lever of the shift/brake control device 17, the inner wire 19a is pulled to move the brake shoes 28 toward each other in a conventional manner.

On the other hand, the sensor 32 is preferably fixedly attached to the brake attachment member 20 in accordance with the present invention, while the wheel magnet 34 is preferably fixedly attached to the front wheel 14 in accordance with the present invention, as explained below. Preferably, the sensor 32 is a separate element from the brake shoes 28. In any case, the sensor 32 is preferably a part of the brake device 12 and the wheel magnet 34 is preferably part of the front wheel 14. The cycle computer 36 is clamped onto the handlebar 15 in a conventional manner and operatively connected to the sensor 32. Thus, the cycle computer 36 receives electrical signals from the sensor 32 by sensing the wheel magnet 34, as explained below in more detail.

Referring now to FIGS. 5-8, the brake mounting member 20 basically includes a main brake fixing bolt 40, a brake fixing nut 42 and a frame fixing nut 44 as well as a variety of spacers/washers arranged on the main fixing bolt in a conventional manner. The brake fixing nut 42 is threaded onto the main fixing bolt 40 to retain the first brake arm 22 and the link member 26 thereon. The frame fixing nut 44 is used to non-movably fix the mounting member 20 to the front fork 13 in a conventional manner.

Figure 7:
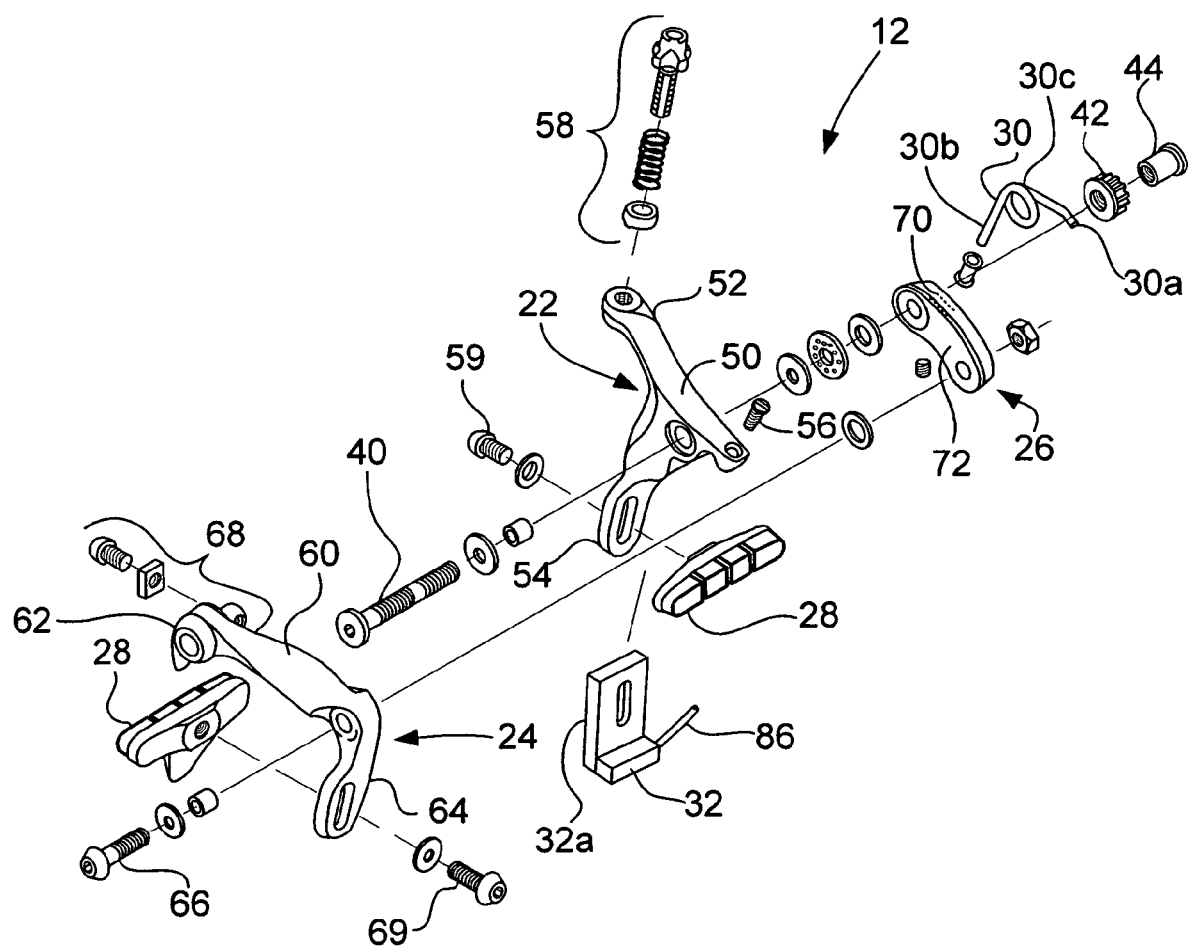
FIG. 7 is an exploded perspective view of the primary braking structure and the sensor of the brake device illustrated in FIGS. 1-6.
Figure 8:
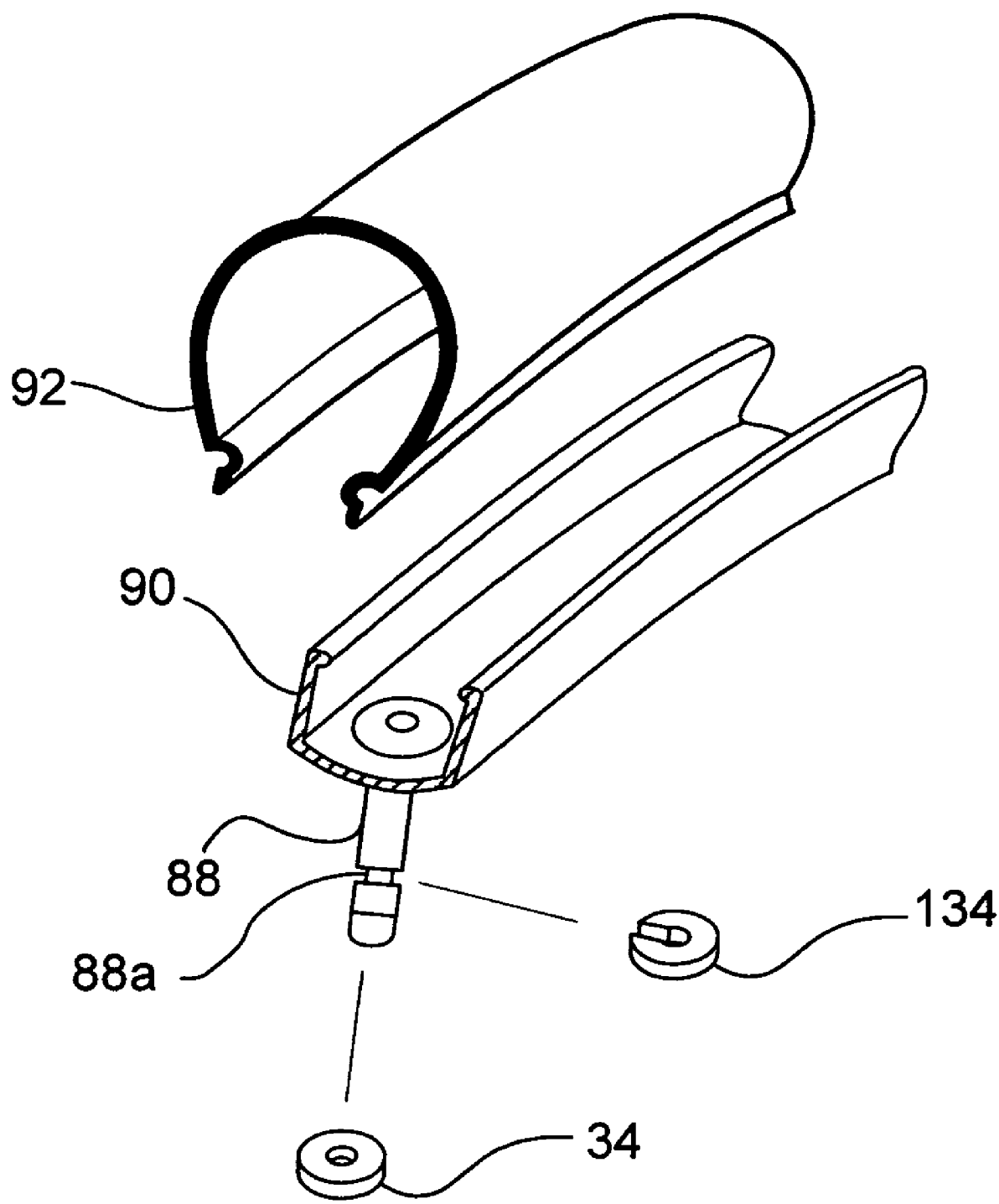
FIG. 8 is an exploded perspective view of a portion of the bicycle wheel and the wheel magnet used with the brake device illustrated in FIGS. 1-7.

Referring to FIG. 7, the first brake arm 22 basically includes a main mounting portion 50, a cable support portion 52 and a first brake shoe mounting portion 54. The main mounting portion 50 is pivotally supported on the main fixing bolt 40. The main mounting portion 50 has an adjustment screw 56 received in a threaded bore that is formed in the free end thereof to control the amount of relative movement between the first and second brake arms 22 and 24 in a conventional manner. The cable support portion 52 has a barrel adjuster 58 coupled thereto in a conventional manner to receive the inner wire 19a therethrough and to partially receive the outer casing 19b. The brake shoe mounting portion 54 has one of the brake shoes 28 fixedly attached thereto via a brake pad fixing bolt or screw 59 and a washer in a conventional manner.

Referring still to FIG. 7, the second brake arm 24 basically includes a main mounting portion 60, a cable attachment portion 62 and a second brake shoe mounting portion 64. The main mounting portion 60 has a secondary fixing bolt 66 non-movably fixed thereto to extend parallel to the main fixing bolt 40. The main mounting portion 60 further includes a protruding area (not shown) arranged to selectively contact the adjustment screw 56 of the first brake arm in a conventional manner. The secondary fixing bolt 66 is pivotally supported by the link member 26. The cable attachment portion 62 has an adjustable wire fixing structure 68 coupled thereto in a conventional manner. The adjustable wire fixing structure 68 has the inner wire 19a fixed thereto in a conventional manner. The brake shoe mounting portion 64 has one of the brake shoes 28 fixedly attached thereto via a brake pad fixing bolt or screw 69 and a washer in a conventional manner.

Referring still to FIG. 7, the link member 26 basically includes a main mounting portion 70 and a secondary mounting portion 72. The main mounting portion 70 is non-movably fixedly coupled on the main fixing bolt 40, while the secondary mounting portion 72 is pivotally supported in the secondary fixing bolt 66 in a conventional manner. Thus, the link member 26 can be considered to be a non-movable part of the mounting member 20. The arrangement of the link member 26 helps control the movement of the first and second brake arms 22 and 24.

The biasing member 30 is preferably a coil spring having a first end 30a, a second end 30b and a coiled portion 30c. The first end 30a is engage with the link member 26 in a conventional manner, while the second end 30b is engaged with the first brake arm 22 in a conventional manner. The coiled portion 30c is arranged between the first and second ends 30a and 30b. The biasing member 30 normally biases the brake shoes 28 laterally away from each other and laterally away from the front wheel 14 so that the front wheel can normally freely rotate about the rotation axis R in a conventional manner. The brake shoes 28 are moved toward each other and toward the wheel 14 against the biasing force of the biasing member 30 when the brake lever of the brake/shift control device is moved to pull the inner wire 19a in a conventional manner.

Basically, in this embodiment, the brake attachment member 20, the first brake arm 22, the second brake arm 24, the link member 26, the brake shoes 28 and the biasing member 30 form a conventional primary braking structure that operates in a conventional manner to apply a braking force to the front wheel 14. Thus, the parts of the primary braking structure will not be explained and/or illustrated in further detail herein. However, it will be apparent to those skilled in the art from this disclosure that the sensor 32 can be integrated with one or more of these parts in accordance with the present invention, as explained below with reference to other preferred embodiments of the present invention.

Referring to FIGS. 1 and 5-7, the sensor 32 is preferably fixedly attached to the mounting member 20 at a location to detect rotational behavior of the bicycle wheel 14 by sensing the magnet 34. The sensor 32 is mounted on a sensor connecting portion 32a that is secured to the bicycle brake 12 as a separable member. In particular, the sensor connecting portion 32a is supported on the brake pad fixing bolt 59. In this embodiment, the sensor 32 is designed to be mounted onto the brake pad fixing bolt 59 as an add-on to form a sensor unit in accordance with the present invention. In other words, in this embodiment, the sensor 32 is designed to be added (i.e. retrofitted) onto a conventional bicycle brake. However, it will be apparent to those skilled in the art from this disclosure that the sensor 32 can be further integrated with a part of the brake device 12 in accordance with the present invention. In any case, the sensor 32 has a conventional sensor element such as a reed switch that is electrically coupled to the cycle computer 36 via an electrical wire 86. Accordingly, the sensor 32 will not be discussed in further detail herein.

Referring now to FIGS. 1, 5, 6 and 8, the front bicycle wheel 14 in accordance with the present invention will now be explained in more detail. The bicycle wheel 14 is conventional, except the wheel magnet 34 is incorporated into an air valve stem 88 in accordance with the present invention.

Specifically, the front wheel 14 basically includes a central hub 89, an annular wheel rim 90 (only a portion shown), an annular tire 92 (only a portion shown) and a plurality of spokes 94 (only a portion shown). Of course, it will be apparent to those skilled in the bicycle art from this disclosure that the bicycle wheel 14 preferably has a continuous circular shape with a substantially uniform cross-section even though only a portion of the front wheel 14 is illustrated herein.

The wheel magnet 34 includes a generally ring-shaped portion constructed of a magnetic material using conventional manufacturing techniques. The wheel magnet 34 is fixed to the air valve stem 88 at a radial location that can be sensed by the sensor 32. Preferably, the magnetic material of the wheel magnet 34 is slightly flexible and resilient for easy installation on the air valve stem 88. The wheel magnet 34 can be a continuous ring shaped magnet or a split ring magnet 134

The air valve stem 88 includes a groove 88a that is configured and arranged to receive the magnet 34 therein. In other words, the magnet 34 has a center opening with a diameter that smaller than the diameter of the air valve stem 88 between the groove 88a and the free end of the air valve stem 88. Of course, the air valve stem 88 can use other configurations to secure the magnet 34 thereto in a tool less manner.

The tire 92 is preferably a conventional tubeless tire such that the air valve stem 88 can be mounted to the rim 90 in a conventional manner. However, the air valve stem 88 can be part of a tube tire if needed and/or desired. In any case, the wheel magnet 34 is preferably coupled to the air valve stem 88 so that the invention can be easily used with any type of rim without the need for a special rim or tire. Of course, it will be apparent to those skilled in the bicycle art from this disclosure that the as an alternative attachment method.

Figure 2:
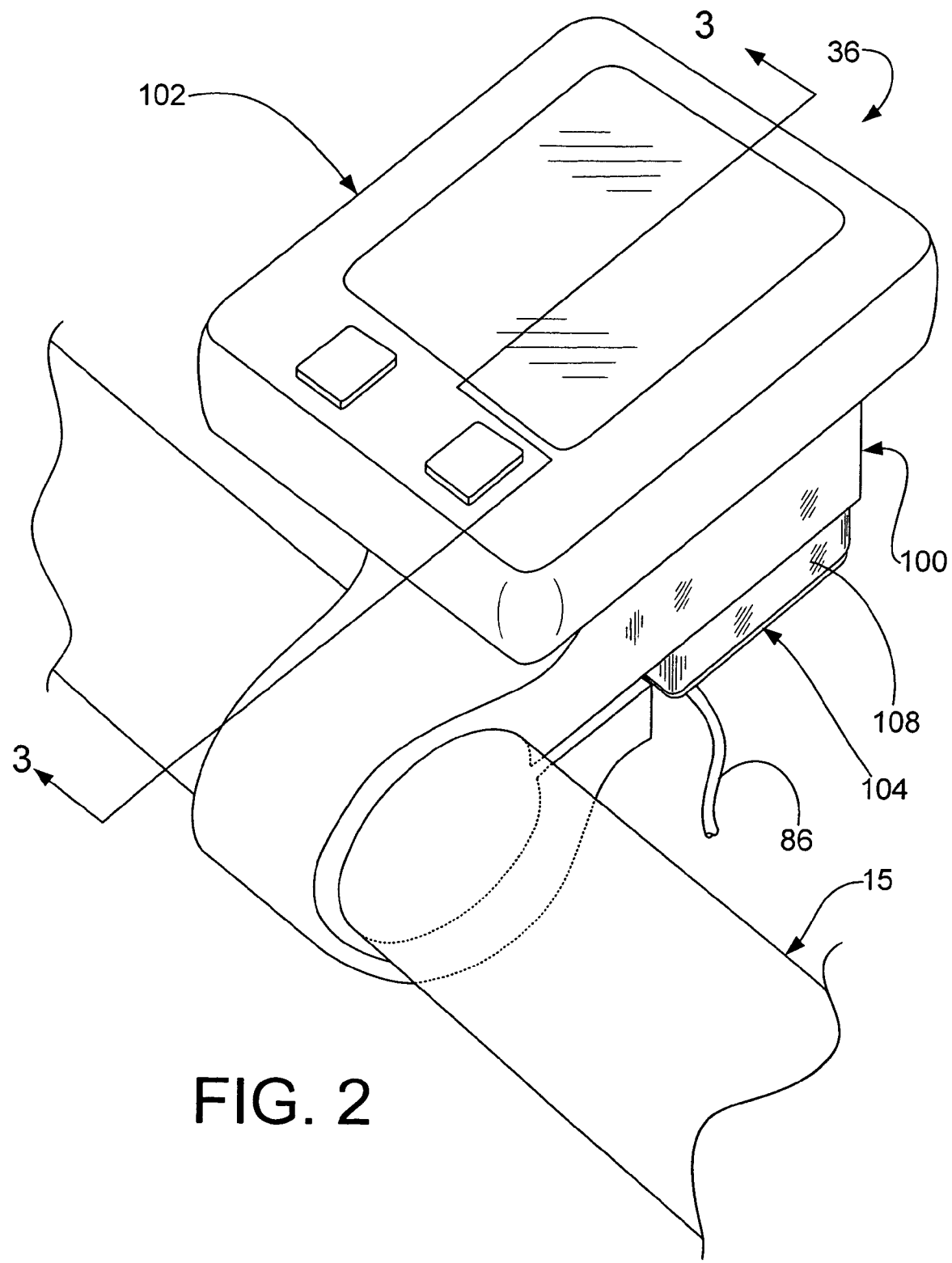
FIG. 2 is an enlarged, top perspective view of the cycle computer of the bicycle brake device illustrated in FIG. 1.
Figure 3:
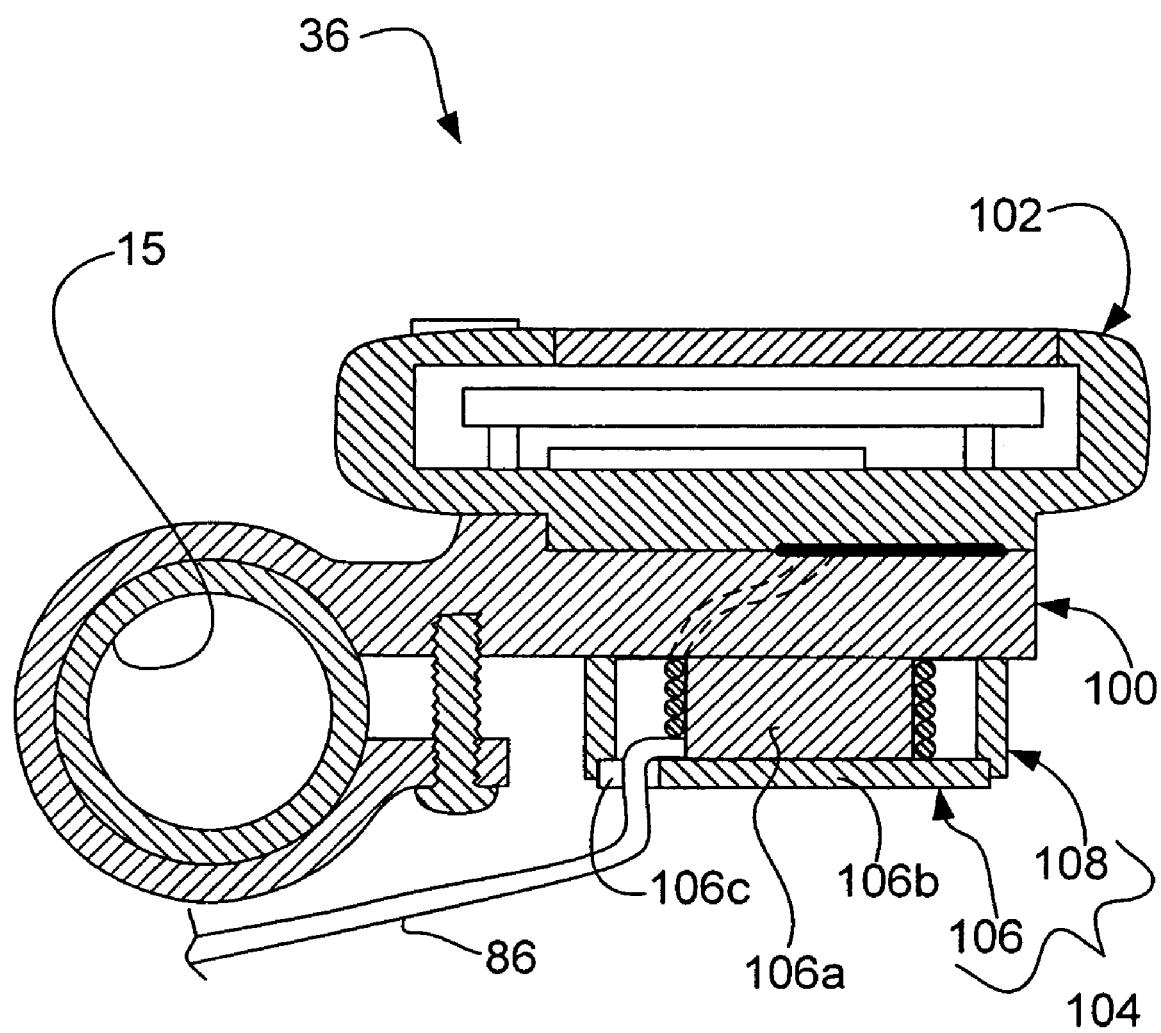
FIG. 3 is a cross-sectional view of the cycle computer illustrated in FIGS. 1 and 2, as seen along section line 3-3 of FIG. 2.
Figure 4:
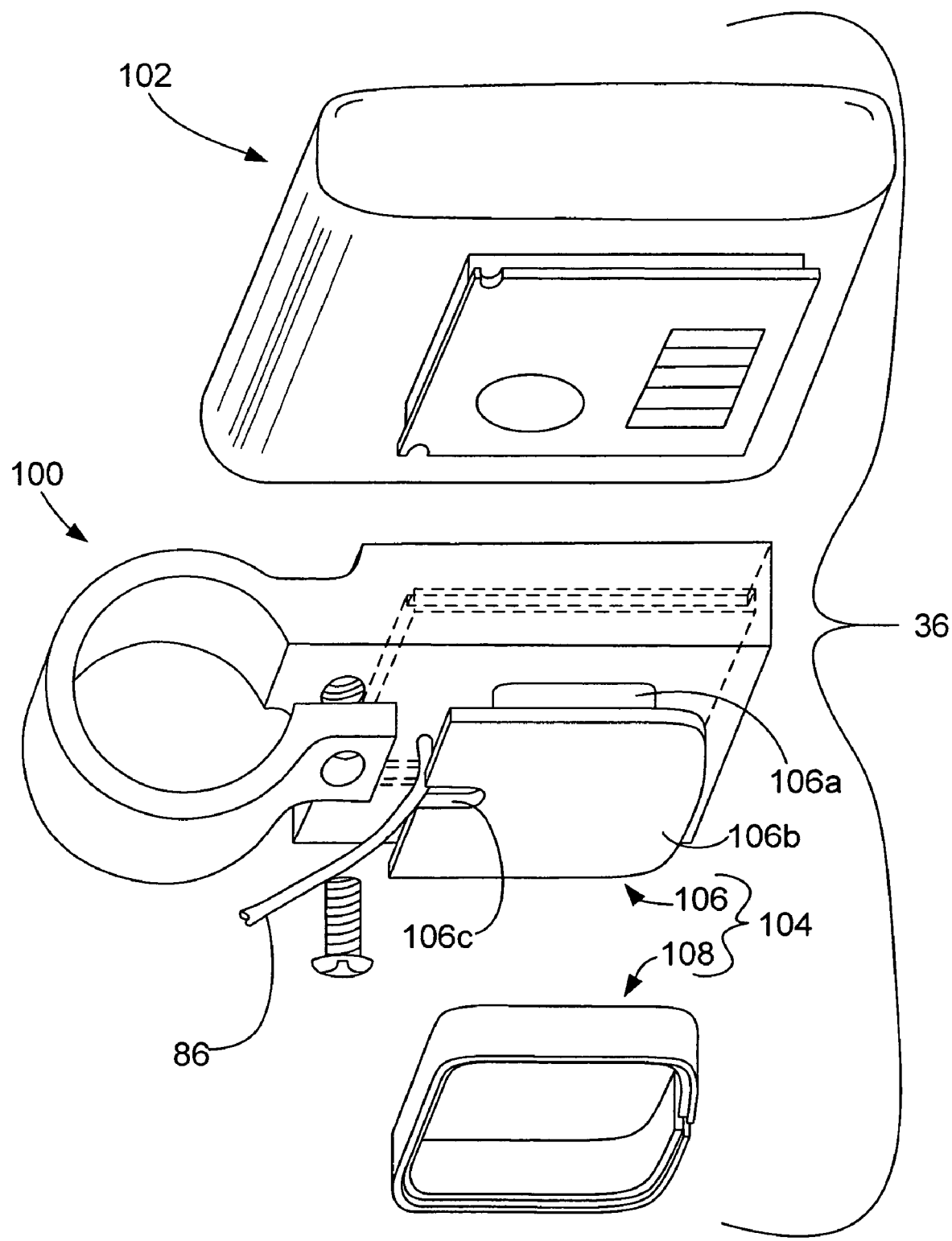
FIG. 4 is an exploded, bottom perspective view of the cycle computer illustrated in FIGS. 1-3, removed from the handlebar for the purpose of illustration.
Figure 5:
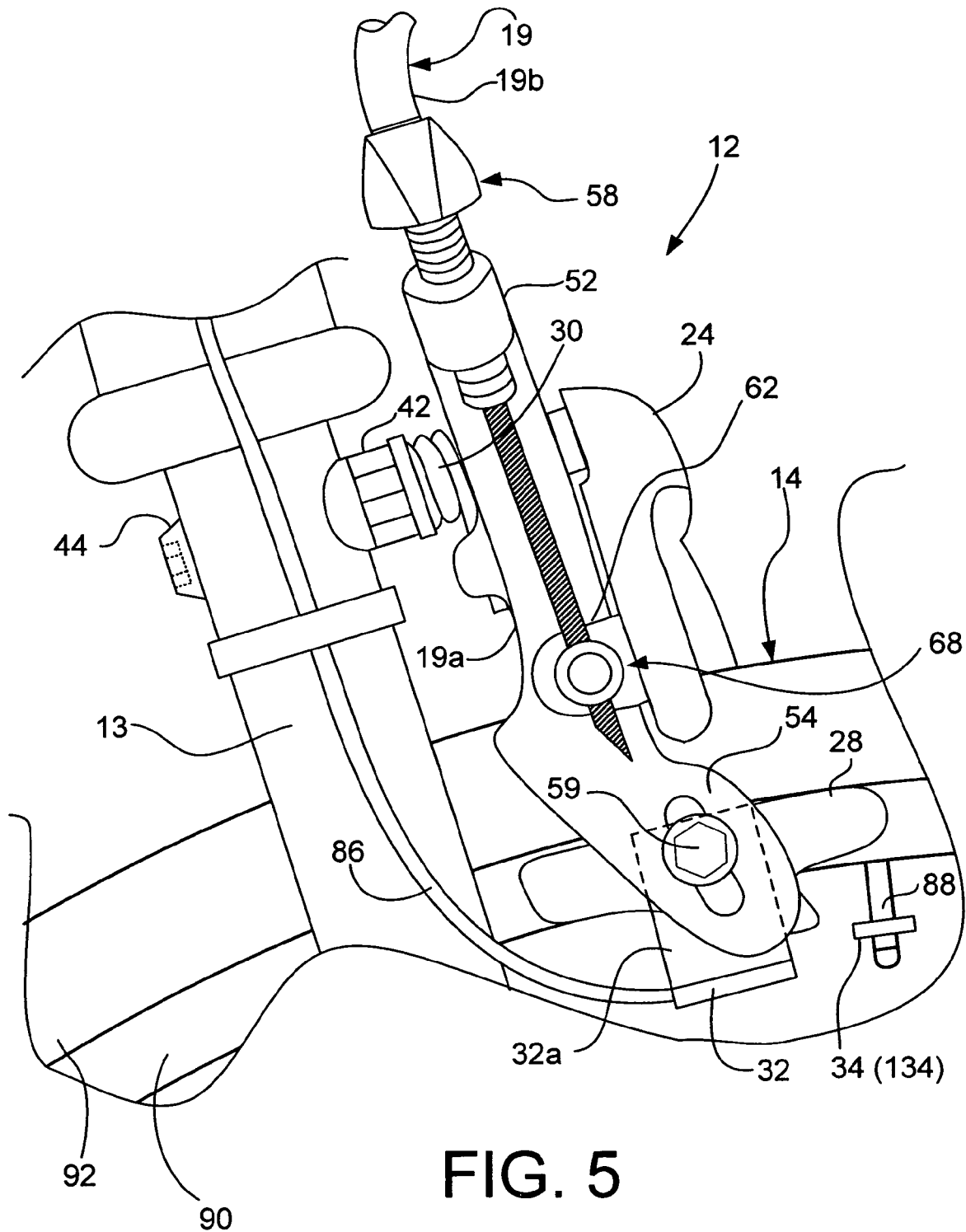
FIG. 5 is an enlarged, side elevational view of the bicycle brake device mounted to the portion of the bicycle illustrated in FIG. 1, to better illustrate the primary braking structure, the sensor and the wheel magnet of the braking device.
Figure 6:
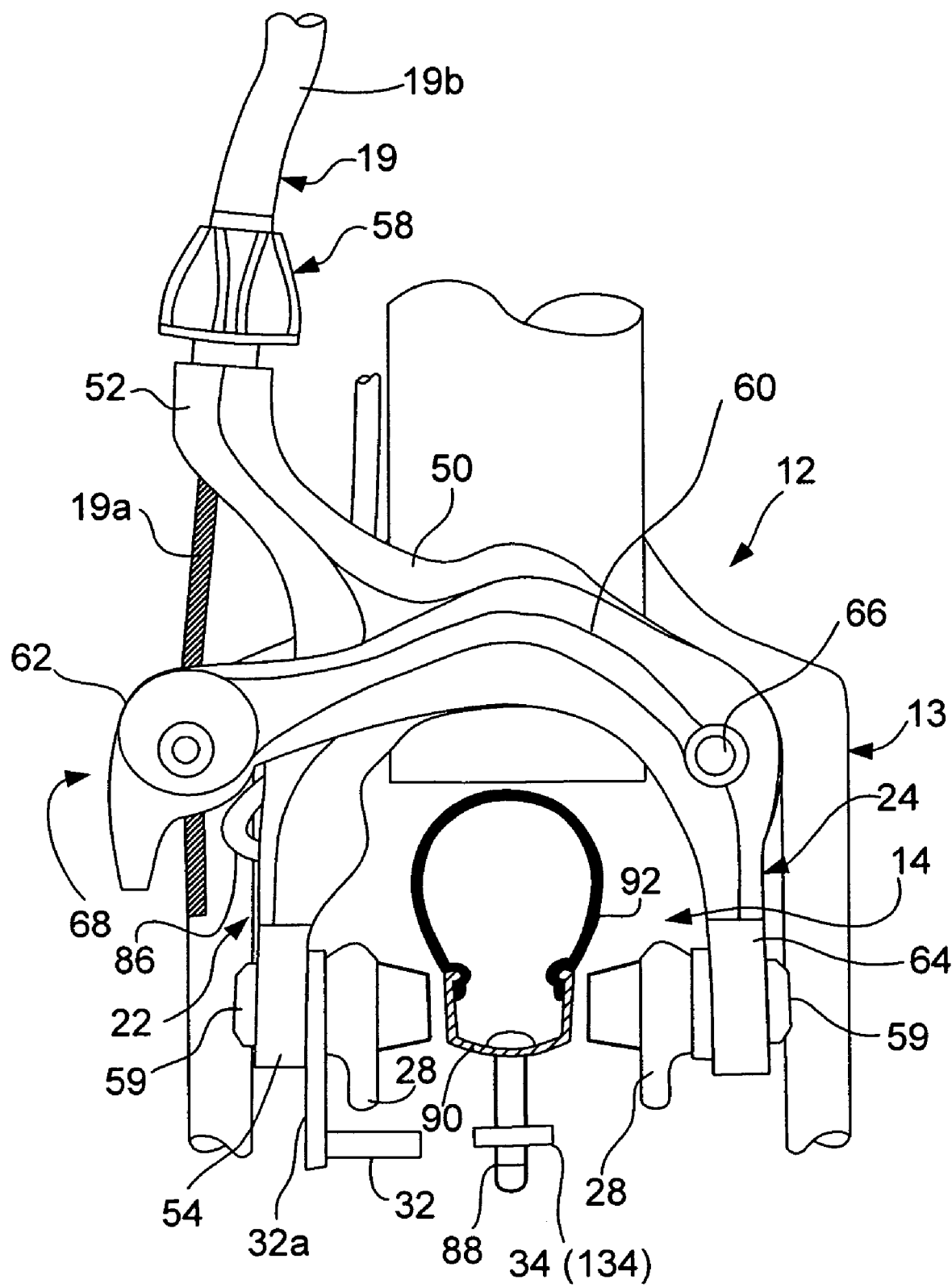
FIG. 6 is a front elevational view of the bicycle brake device mounted to the portion of the bicycle illustrated in FIG. 5.

Referring to FIGS. 2-4, the cycle computer 36 will now be explained in more detail. The cycle computer 36 basically includes a handlebar attachment unit 100 and a main computer unit 102 releasably coupled to the handlebar attachment unit 100. The cycle computer 36 is conventional, except the handlebar attachment unit 100 includes a wire winding mechanism 104 designed to retain any excess slack in the electrical wire 86 extending from the sensor 32.

The main computer unit 102 basically is conventional. Thus, the main computer basically includes a power supply (battery), a central processing unit (CPU), a read only memory (ROM), a random access memory (RAM), an I/O interface, a display screen (LCD), a pair of user operable buttons, etc, in a conventional manner. The main computer unit 102 is detachably coupled to the handlebar attachment unit 100 via a sliding snap-fit type arrangement in a conventional manner. When the main computer unit 102 is coupled to the handlebar attachment unit 100, electrical contacts of the main computer unit 102 are electrically coupled to electrical contacts of the handlebar attachment unit 100 in a conventional manner. Because the main computer unit 102 is basically conventional, the main computer unit 102 will not be discussed in further detail herein.

The handlebar attachment unit 100 is conventional, except for the presence of the wire winding mechanism 104. Thus, the handlebar attachment unit 100 basically includes a clamping portion designed to be clamped onto the handlebar 15 with a fastener in a conventional manner, and a computer support portion that has the main computer unit 102 slideably snap-fitted therewith in a conventional manner. The electrical wire 86 extends from the bottom of the main computer unit 102 in a conventional manner. The wire 86 is electrically coupled to the electrical contacts of handlebar attachment unit 100 in order to electrically couple the main computer unit 102 to the sensor 32. Because the handlebar attachment unit 100 is basically conventional (i.e. except for the winding mechanism 104), the handlebar attachment unit 100 will not be discussed in further detail herein, except as related to the wire winding mechanism 104.

The wire winding mechanism 104 basically includes a spool member 106 configured to have the electrical wire 86 wound around the spool member 106, and a spool cap 108 detachably coupled to the spool member 106 to retain the electrical wire 86 on the spool member 106. Specifically, any excess of the electrical wire 86 is first wound around the spool member 106, and then the spool cap 108 is snapped onto the spool member 106 to prevent unwinding of the electrical wire 86.

More specifically, the spool member 106 has a winding portion 106a with a tubular external surface and a retaining portion 106b that is larger than the winding portion 106a to prevent the wound electrical wire 86 from falling off of the winding portion 106a. The spool cap 108 is mounted around the outer periphery of the retaining portion 106b to form a tubular cavity for the electrical wire 86. The retaining portion 106b has a notch or cutout 106c formed therein so that the electrical wire 86 can extend out of the tubular cavity to the sensor 32.

Second Embodiment

Figure 9:
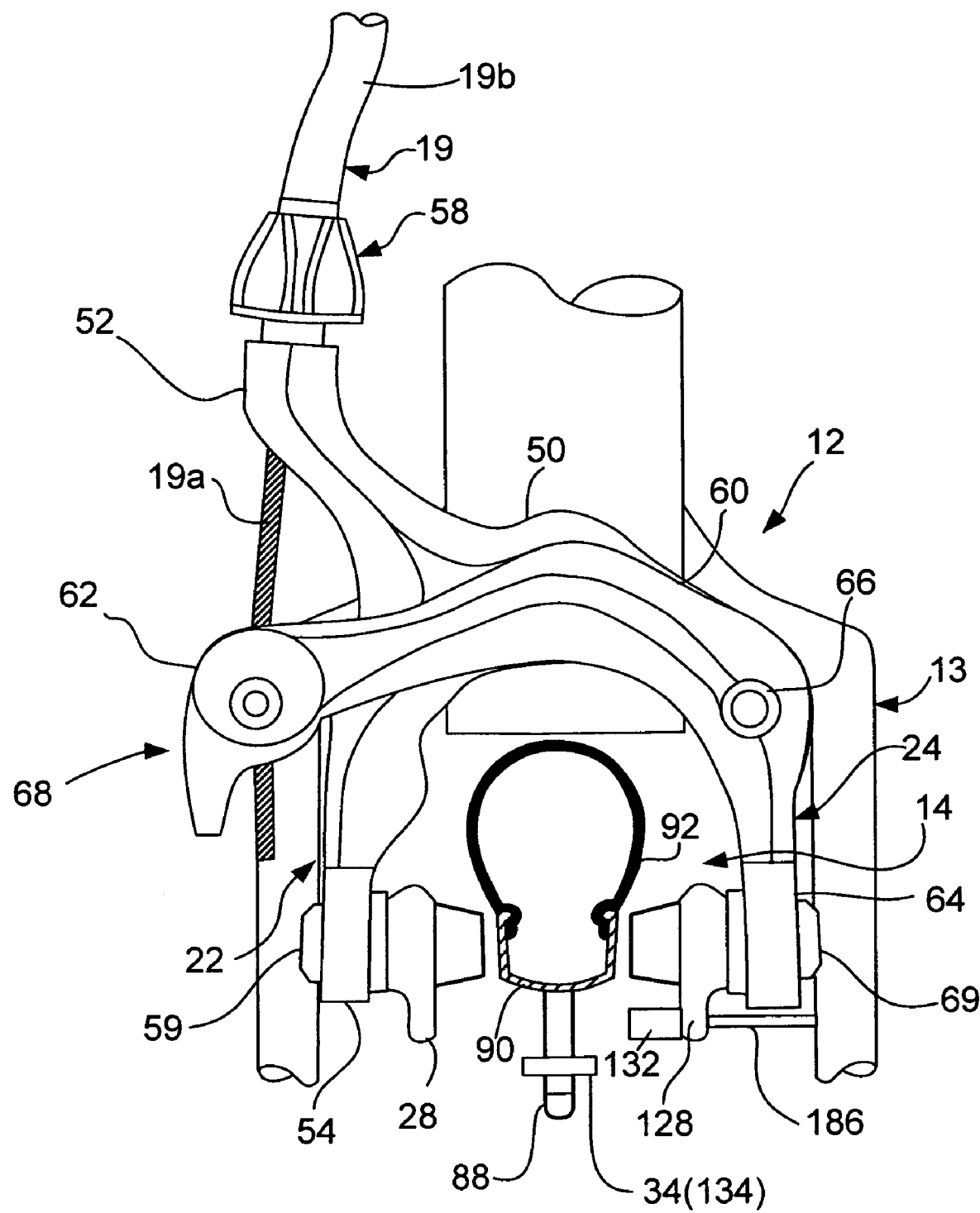
FIG. 9 is a front elevational view of a portion of a brake device in accordance with a second embodiment of the present invention.
Figure 10:
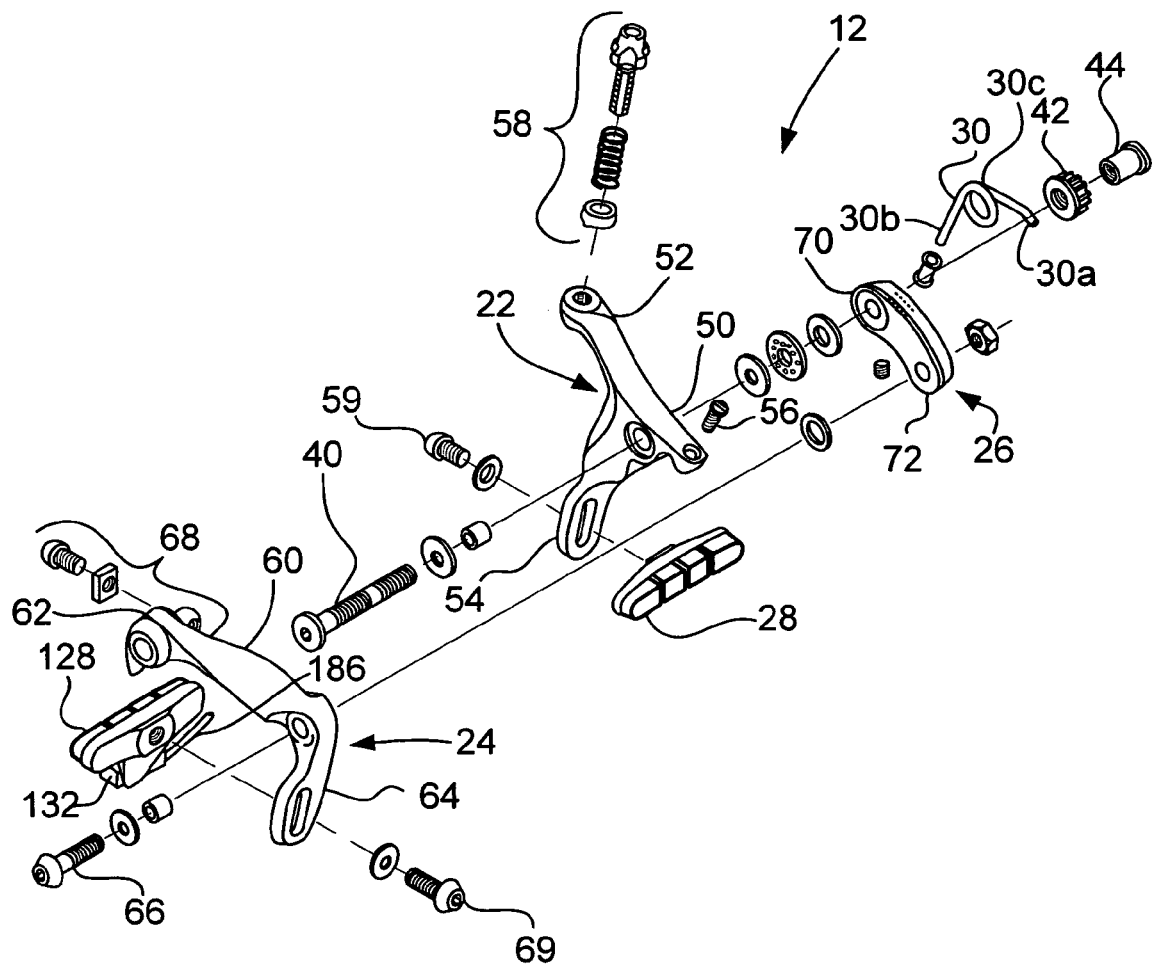
FIG. 10 is an exploded perspective view of the primary braking structure and the sensor of the brake device in accordance with the second embodiment of the present invention.

Referring now to FIGS. 9 and 10, modifications to the braking device 12 will now be explained in accordance with a second embodiment. In view of the similarity between the first and second embodiments, the parts of the second embodiment that are identical to the parts of the first embodiment will be given the same reference numerals as the parts of the first embodiment in FIGS. 9 and 10. Moreover, in view of the similarity between the first and second embodiments, it will be apparent to those skilled in the art from this disclosure that the descriptions and illustrations of the first embodiment also apply to this second embodiment, except as explained and illustrated herein. In other words, the descriptions of the parts of the second embodiment that are identical to the parts of the first embodiment may be omitted for the sake of brevity.

In this second embodiment, one of the brake shoes 28 have been substituted with a modified brake shoe 128 that includes an integrated sensor 132 and the sensor 32 of the first embodiment has been eliminated. Here, the sensor 132 is fixedly coupled to a brake pad holder of the brake shoe 128 with an electrical wire 186 attached to the cycle computer 36. Thus, the sensor 132 is operatively coupled to the cycle computer 36 in the same manner as the first embodiment.

Of course, it will be apparent to those skilled in the bicycle art from this disclosure that a modified brake fixing nut (not shown) could be provided with the sensor 132 and/or the splined surface of the mounting portion 50 or 60 could be modified to be used with such a differently shaped nut as needed and/or desired.

As used herein, the following directional terms "forward, rearward, above, downward, vertical, horizontal, below and transverse" as well as any other similar directional terms refer to those directions of a bicycle equipped with the present invention. Accordingly, these terms, as utilized to describe the present invention should be interpreted relative to a bicycle equipped with the present invention.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed. These terms of degree should be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A bicycle motion sensing arrangement comprising:
   a bicycle wheel including a rim, an air valve stem extending radially inward from the rim with the air valve stem including a groove, and a magnet disposed in the groove of the air valve stem, the magnet having a center opening with a diameter that is smaller than a maximum diameter of the air valve stem between the groove and a free end of the air valve stem to retain the magnet on the air valve stem;
   a bicycle brake configured to be mounted to a bicycle frame, the bicycle brake including a pair of brake pads; and
   a sensor fixedly attached to the bicycle brake at a location radially inward of the brake pads to detect rotational behavior of the bicycle wheel by sensing the magnet mounted to the air valve stem, when the bicycle motion sensing arrangement is mounted to a bicycle.

2. The bicycle motion sensing arrangement according to claim 1, wherein
   the bicycle brake includes a pair of bicycle brake arms and a pair of a brake shoes with one of the brake shoes fixedly coupled to each of the bicycle brake arms.

3. The bicycle motion sensing arrangement according to claim 1, wherein
   the sensor is mounted on a sensor connecting portion that is secured to the bicycle brake as a separable member that is detachable and re-attachable to the bicycle brake.

4. The bicycle motion sensing arrangement according to claim 3, wherein
   the bicycle brake includes a brake pad fixing bolt with the sensor connecting portion being supported on the brake pad fixing bolt.

5. The bicycle motion sensing arrangement according to claim 4, further comprising
   a bicycle computer unit electrically coupled to the sensor.

6. A bicycle motion sensing arrangement comprising:
   a bicycle wheel including an air valve stem and a magnet mounted to the air valve stem;
   a bicycle brake configured to be mounted to a bicycle frame; and
   a sensor fixedly attached to the bicycle brake at a location to detect rotational behavior of the bicycle wheel by sensing the magnet mounted to the air valve stem,
   the air valve stem including a groove with the magnet disposed in the groove of the air valve stem, the magnet having a center opening with a diameter that is smaller than a maximum diameter of the air valve stem between the groove and a free end of the air valve stem to retain the magnet on the air valve stem.

7. The bicycle motion sensing arrangement according to claim 6, wherein
   the magnet includes a generally ring-shaped portion.

8. The bicycle motion sensing arrangement according to claim 7, wherein
   the generally ring-shaped portion is a continuous ring.

9. A bicycle motion sensing arrangement comprising:
   a bicycle wheel including an air valve stem and a magnet mounted to the air valve stem, the air valve stem including a groove with the magnet disposed in the groove of the air valve stem, the magnet including a split ring as a generally ring-shaped portion having a center opening with a diameter that is smaller than a maximum diameter of the air valve stem between the groove and a free end of the air valve stem to retain the magnet on the air valve stem;
   a bicycle brake configured to be mounted to a bicycle frame; and
   a sensor fixedly attached to the bicycle brake at a location to detect rotational behavior of the bicycle wheel by sensing the magnet mounted to the air valve stem.

10. A bicycle motion sensing arrangement comprising:
    a bicycle wheel including a rim, an air valve stem extending radially inward from the rim, and a magnet mounted to the air valve stem, the magnet having a center opening surrounding an outer periphery of the air valve stem;
    a bicycle brake configured to be mounted to a bicycle frame, the bicycle brake including a pair of brake pads; and
    a sensor fixedly attached to the bicycle brake at a location radially inward of the brake pads to detect rotational behavior of the bicycle wheel by sensing the magnet mounted to the air valve stem, when the bicycle motion sensing arrangement is mounted to a bicycle,
    the bicycle brake including a pair of bicycle brake arms and a pair of brake shoes with one of the brake shoes fixedly coupled to each of the bicycle brake arms,
    the sensor being a separate element from the brake shoes such that the sensor is detachable and re-attachable by a brake pad fixing bolt of one of the brake shoes.

* * * * *